Nov. 21, 1933.                W. PARKER                1,935,988
                         BEAD FORMING MACHINE
              Original Filed April 24, 1930    3 Sheets-Sheet 1
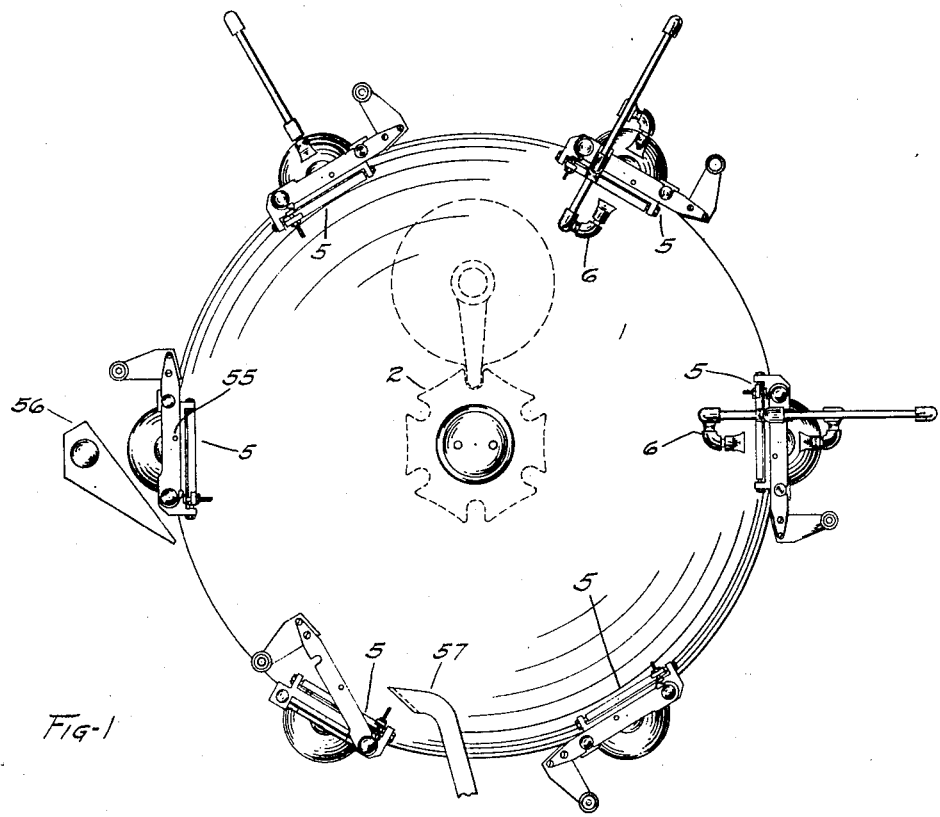
Fig-1
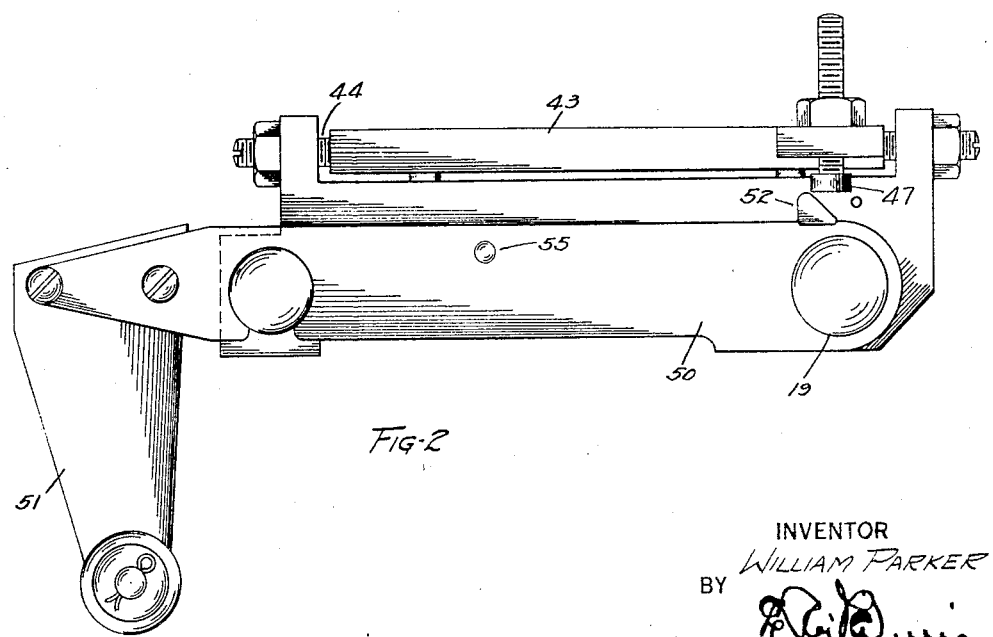
Fig-2
INVENTOR
WILLIAM PARKER
BY
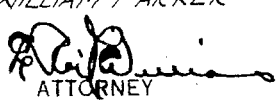
ATTORNEY Nov. 21, 1933.     W. PARKER     1,935,988

BEAD FORMING MACHINE

Original Filed April 24, 1930     3 Sheets-Sheet 2

INVENTOR
WILLIAM PARKER
BY
ATTORNEY

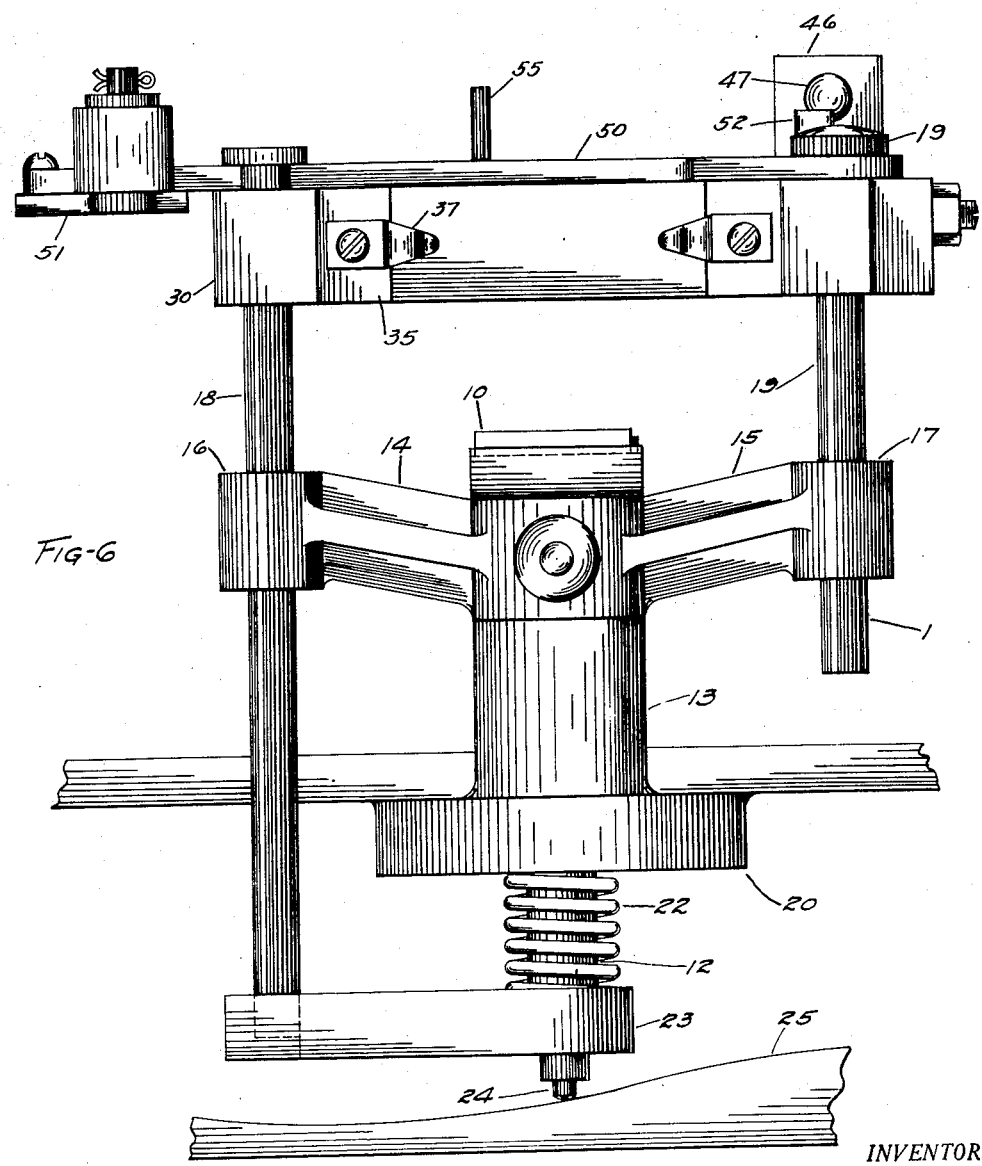

Patented Nov. 21, 1933

1,935,988

UNITED STATES PATENT OFFICE 1,935,988

BEAD FORMING MACHINE

William Parker, Oak Park, Ill., assignor to Grigsby-Grunow Company, Chicago, Ill., a corporation of Illinois Application April 24, 1930, Serial No. 446,902
Renewed November 7, 1932

14 Claims. (Cl. 49—2)

This invention relates to machines for the manufacture of radio apparatus and particularly to the manufacture of beads for use in vacuum tubes. In order to support the various electrodes in the vacuum tube relative to each other, it is customary to dispose a bead therein composed of a glass rod, into which have been sealed a number of wires. These wires may then be bent and welded as desired. In the manufacture of such beads, the glass rod is heated to render it soft and is forced against a number of wires, suitably held so that the wires are sealed into the glass. A machine for making this consists of a turret which intermittently revolves or indexes from one position to another. Upon this turret are mounted a plurality of heads, each one carrying the mechanism for making a bead. The head as a rule consists of a bead retaining member which is adapted to be moved up and down by a cam. Above this member is a bead wire pocket, which has usually consisted of a block, having suitably spaced apertures for the reception of the bead wires. A cover is provided to maintain the wires when the glass is forced against them.

To obtain perfect beads it is essential that the wires fit snugly in the pocket. In case the pocket becomes filled with dirt it is evident that loading will become difficult and result in numerous bent wires. Unloading in such a case will also result in bent wires and unsatisfactory beads.

An object of my invention is to devise a head which may be easily loaded and unloaded and which will function in an efficient manner. A further object, is the provision of automatic means on the machine which will render the head easy to load at a pre-determined index position, and then maintain the head in normal condition during the remainder of the cycle.

Referring to the drawings:

Figure 1 is a plan view looking down upon a bead forming machine.

Figure 2 is a similar view looking down upon one of the heads.

Figure 6 is an elevation of the head showing the cam and bead retaining member.

Figure 3:
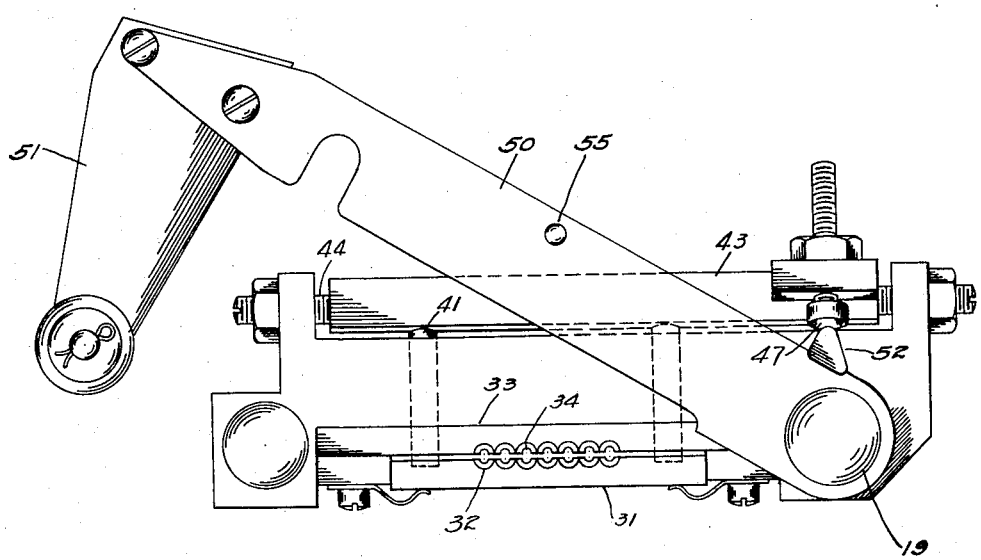
Figure 3 is a view similar to Figure 2, showing the head in open position.

Referring to Figure 1, the bead forming machine comprises a turret or an intermittently revolving table 1 having a suitable intermittent mechanism 2, for the operation thereof. Mounted at spaced intervals along the periphery of 1 are a plurality of heads 5. Gas fires 6, are provided in certain positions to soften the glass so that the wires may penetrate therein.

Each head comprises a semi-cylindrical member 10, into which a bead 11, is adapted to rest. This retaining member is supported by a post 12, which is adapted to slide within a supporting journal 13. Supporting journal 13 is provided with extensions 14 and 15, terminating in apertured portions 16 and 17. Posts 18 and 19 supporting the upper portion of the head pass through apertured portions 16 and 17 and serve to maintain journal portion 13 in desired positions. The lower portion of journal 13, is provided with a shoulder 20, to prevent upward travel.

Surrounding post 12, below shoulder 20, is a coil spring 22, between shoulder 20 and a collar 23, rigidly fastened to post 12. Post 12 terminates in a reduced portion 24, which cooperates with a cam surface 25. It is evident that portion 24 will be forced upwardly by cam 25, to force post 12, and bed 10, upwardly against the compression of spring 22. Suitable means may be provided for preventing bed 10 from turning during its travel.

Figure 4:
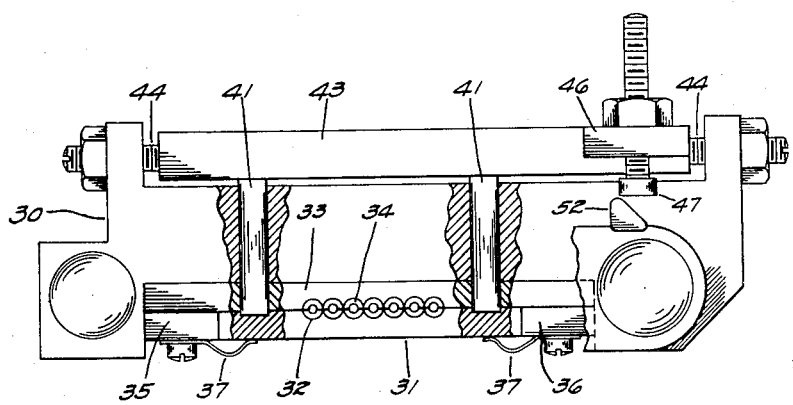
Figure 4 is a view looking down upon the head with certain parts broken away.
Figure 5:
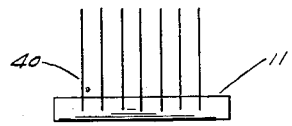
Figure 5 is a detail of a bead.

Posts 18 and 19, at their top ends, carry a structure 30, in one portion of which is mounted a wire pocket 31. This pocket consists of two blocks 32 and 33, each block provided with a plurality of semi-circular indentations, which when fitted together, as shown in Figure 4, form apertures 34. Block 33 is rigidly fastened to supporting member 30, by any suitable means. Block 32 is embraced between two shoulders 35 and 36 of block 33, and is pressed against block 33 by springs 37.

In order to separate blocks 32 and 33 and thus enlarge apertures 34 to facilitate loading of wires 40, there are provided a plurality of parallel pins 41, passing through suitable apertures in member 30 and block 33 and bearing against block 32. It is evident that blocks 32 and 33, may be separated against the tendency of springs 37 by pressure on pins 41. This pressure is obtained by the provision of a rectangular rock shaft 43, mounted at its ends by threaded members 44. A projection 46, through which passes an adjustable stop 47, is provided for rock shaft 43. A cover 50 provided with a handle 51, is pivoted on post 19, and carries an extension 52 for cooperation for stop 47.

As shown in Figure 3, upon the opening of cover 50, extension 52 engages stop 47, and rocks shaft 43. By virtue of the rectangular cross-section of rock shaft 43, pins 41, are forced inwardly, thus opening wire pocket 31.

In order to open cover 50 automatically upon the completion of a bead, a pin 55 is provided on handle 50, and is adapted to cooperate with a cam block 56, suitably mounted. It is evident from Figure 1, that upon the rotation of turret 1, the head adjacent block 56, will have its cover opened by the inneraction of pin 55 and block 56. During the time that the block is opened the entire bead may be removed and materials for a new bead may be loaded into the head. An arm 57 may be provided to cooperate with pin 55, to automatically close the cover upon loading of the head.

The general application of a split wire pocket for machines of this general character is disclosed and claimed in a copending application of mine, Serial No. 446,903 filed April 24, 1930.

I claim:

1. In a bead forming machine, a head comprising a split, bead wire pocket, a cover for said pocket and means for opening said pocket upon removal of the cover therefrom.

2. In a bead forming machine, a bead wire pocket comprising two split blocks, a cover for said pocket, and means associated with said cover whereby said blocks are automatically opened when said cover is operated.

3. In a bead forming machine, a head comprising a bead retaining member, a bead wire pocket disposed above said member, said pocket comprising a plurality of members fitting together to form retaining apertures for said bead wires, a cover over said bead wire pocket, and means cooperating with said cover for enlarging said bead wire apertures in said pocket upon movement of said cover.

4. In a bead forming machine, a head comprising a bead retaining member, a bead wire pocket disposed above said member, said pocket consisting of a plurality of members adapted to fit together and form bead wire apertures, spring means for maintaining said pocket forming members in position, a cover disposed over said pocket, and means cooperating with said cover for separating said pocket forming members.

5. A bead forming machine comprising a turret adapted to index from one position to another, a plurality of heads mounted thereon, each head comprising a bead retaining member, a plurality of members above said bead retaining member adapted to form a bead wire pocket when pressed together, a cover disposed above said pocket, and automatic means for operating said cover and pocket in predetermined index positions whereby said cover and pocket remain open during a predetermined time interval for the insertion of bead wires.

6. A bead forming machine comprising a turret adapted to index from one position to another, a plurality of heads on said turret, each head comprising a bead retaining member, a bead wire pocket composed of two split blocks, a rock shaft, and means cooperating with said rock shaft and split blocks to separate said blocks at predetermined index positions.

7. A bead forming machine comprising a turret adapted to index from one position to another, a plurality of heads mounted thereon, each head comprising a bead retaining member, a plurality of interfitting blocks forming a bead wire pocket, a cover for said pocket, and means for separating said blocks upon predetermined movement of said cover.

8. A bead forming machine comprising a turret adapted to index from one position to another, heads mounted thereon, each head comprising a bead retaining member, a plurality of interfitting blocks forming a bead wire pocket, a cover for said pocket, a rocking member, and means cooperating with said cover and said member for automatically opening said pocket at predetermined index positions.

9. A bead forming machine comprising a turret adapted to index from one position to another, a plurality of heads mounted thereon, each head comprising a bead retaining member, a plurality of interfitting blocks forming a bead wire pocket, a cover for said pocket, means for normally maintaining said blocks together, and means for opening said block upon movement of said cover.

10. In a bead forming machine, a head comprising a bead retaining member, a split block bead wire pocket, a removable cover for said pocket, a rock shaft, spring means normally tending to keep said split blocks together, and means cooperating with said rock shaft for separating said split blocks upon movement of said cover.

11. In a bead forming machine, a head comprising a bead retaining member, a split block bead wire pocket, a removable cover therefor, a rock shaft, spring means acting on one of said blocks to maintain said pocket intact, and pins between said rock shaft and said block for opening said pocket upon movement of said cover.

12. In a bead forming machine, a head comprising a bead retaining member, a plurality of blocks forming a bead wire pocket, a removable cover therefor, a rock shaft, means on said cover for actuating said rock shaft upon movement of said cover, and means for separating said blocks upon movement of said rock shaft.

13. In a bead forming machine, a split wire pocket, a cover for said pocket, means operated by said cover for opening said pocket when said cover is turned away from said pocket and for closing said pocket when said cover is over said pocket, and a glass bead retaining member disposed below said pocket and in line with said wires, said member and pocket being adapted to be moved relatively to each other for forming a bead.

14. A glass working machine for securing metal and glass parts together comprising an intermittently rotatable support, a work holder mounted on said support for holding a glass rod, means positioned adjacent the path of travel of said work holder for heating the glass rod carried thereby, a frame mounted on said work holder and movable relative thereto, a wire guide block carried by said frame, said frame and wire guide block having cooperating semi-cylindrical grooves therein for positioning a wire in juxta-position with and extending at right angles to said glass rod, a cam, and an actuating rod connected to said frame and cooperating with said cam to move said frame relative to said work holder during the rotary movement of the support, to effect the pressing of the wire at right angles into said glass upon the heating of the latter.

WILLIAM PARKER.